Figure 1:
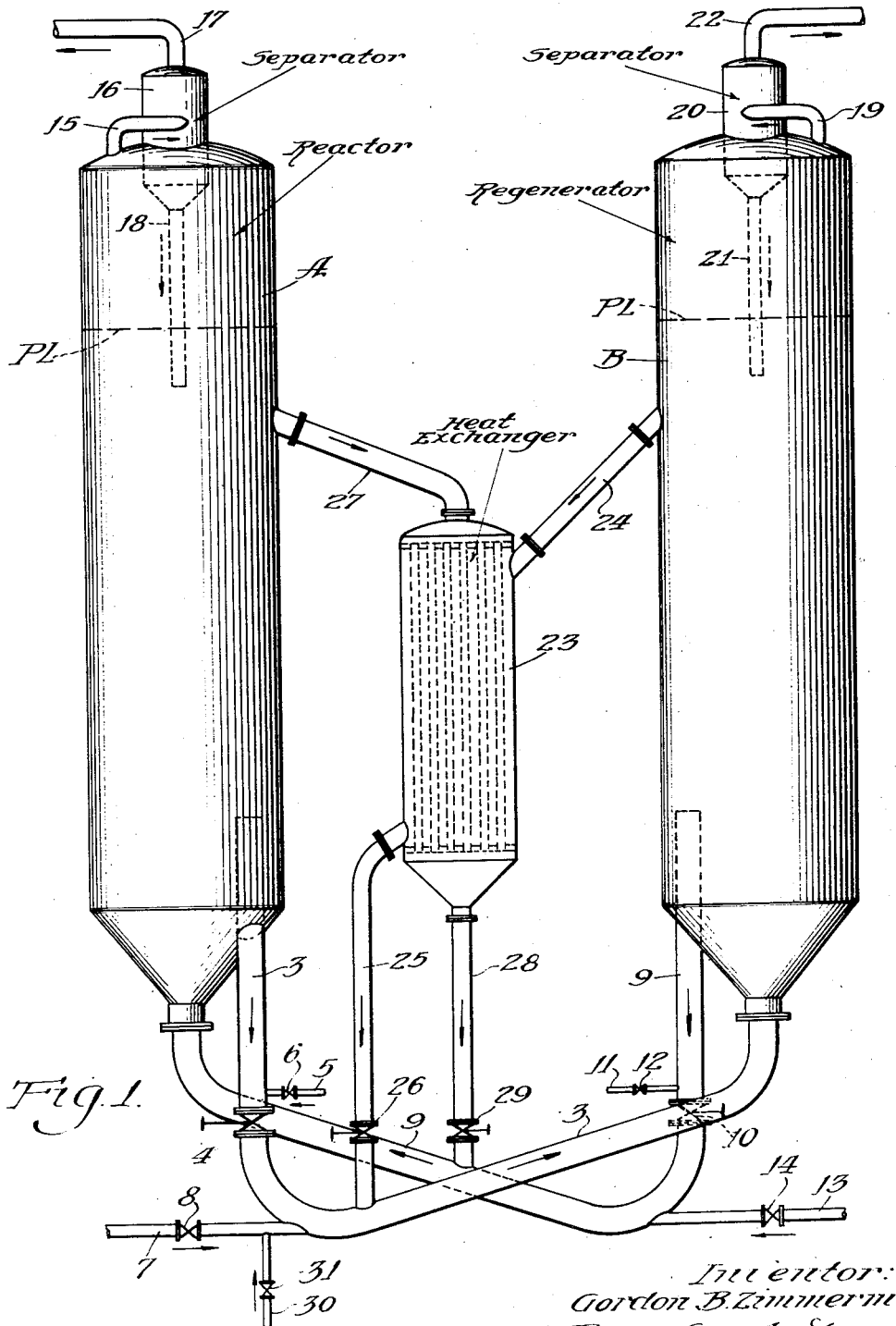

Dec. 3, 1946.  G. B. ZIMMERMAN  2,412,025
CATALYTIC CONVERSION OF HYDROCARBONS
Filed Sept. 24, 1942  2 Sheets-Sheet 1

Inventor:
Gordon B. Zimmerman,
By: Lee J. Gary
Attorney

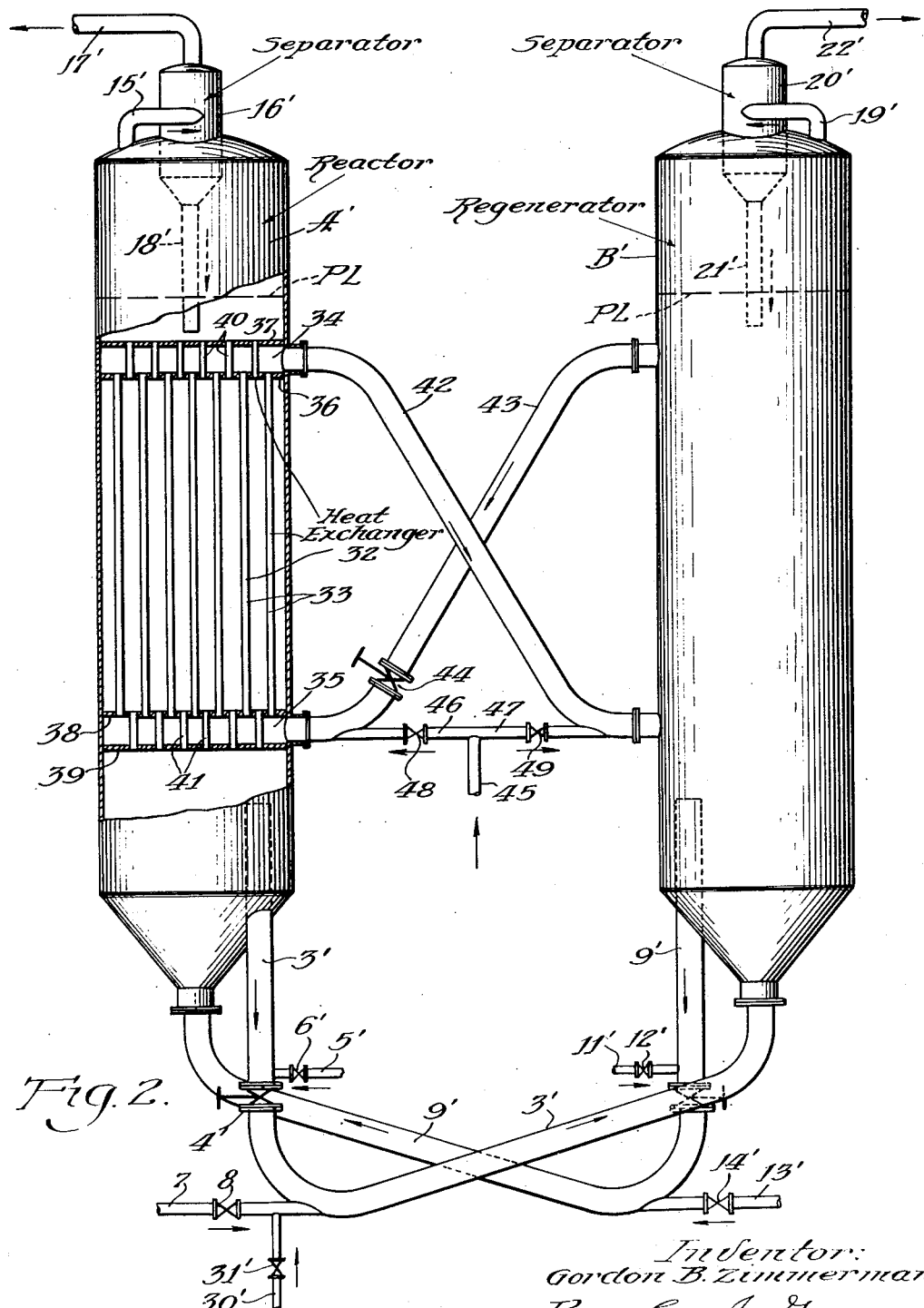

Patented Dec. 3, 1946

2,412,025

UNITED STATES PATENT OFFICE 2,412,025

CATALYTIC CONVERSION OF HYDROCARBONS

Gordon B. Zimmerman, Chicago, Ill., assignor to Universal Oil Products Company, Chicago, Ill., a corporation of Delaware Application September 24, 1942, Serial No. 459,548

1 Claim. (Cl. 196—52)

The invention is directed to an improved process for the catalytic conversion of hydrocarbons and particularly to that type of catalytic conversion process having a reaction zone in which the catalyst is employed to promote the hydrocarbon conversion reaction, and a separate regenerating zone wherein combustible contaminants deposited on the catalyst particles during the conversion reaction are burned therefrom to maintain the catalyst in active state, contaminated catalyst being continuously supplied from the reaction zone to the regenerating zone and hot regenerated catalyst being continuously returned from the regenerating zone to the reaction zone.

In operations of the type above mentioned, wherein the hydrocarbon conversion reaction is of a highly endothermic nature, the catalyst serves the dual function of promoting the hydrocarbon conversion reaction, by virtue of its catalytic activity, and supplying to the reaction zone a substantial portion of the heat required for conducting the reaction, this heat being stored in the catalyst particles during their regeneration and transferred from the regenerating zone to the reaction zone by return of the hot regenerated catalyst thereto.

The temperature at which the regenerated catalyst can be transferred from the regenerating zone to the reaction zone is limited by the temperature which can be safely employed in the regenerating zone without permanently impairing the activity of the catalyst. In addition to this limitation, other factors determine the quantity of heat which can be thus transferred from the regenerating zone to the reaction zone. These additional factors include the amount of combustible contaminants deposited on the catalyst and burned therefrom in the regenerating zone, the heat-carrying capacity of the catalytic material and the rate at which it is circulated from the reaction zone to the regenerating zone and back to the reaction zone.

In some operations, such as, for example, the catalytic cracking of relatively heavy oils, the quantity of carbonaceous or heavy hydrocarbonaceous material deposited on the catalyst and burned therefrom in the regenerating step is adequate or more than adequate to satisfy the heat requirements of the endothermic conversion reaction and, by circulating the catalyst between the reaction and regenerating zones at a sufficiently rapid rate, the total amount of heat required for conducting the conversion reaction (in addition to that supplied to the reaction zone in the preheated hydrocarbon reactants) can be transferred from the regenerating zone to the reaction zone in the regenerated catalyst.

In other operations, such as, for example, the catalytic cracking or reforming of relatively light oils and the catalytic dehydrogenation of normally gaseous hydrocarbons, the quantity of combustible contaminants deposited on the catalyst and burned therefrom in the exothermic regenerating step is not sufficient to satisfy the thermal requirements of the endothermic conversion reaction and a considerable quantity of heat, other than that stored in the reactivated catalyst by burning of the combustible contaminants therefrom, must be supplied to the reaction zone. The additional heat requirement can be satisfied, at least in part, by heating the hydrocarbon reactants to a higher temperature than would otherwise be necessary prior to their introduction into the reaction zone and into contact with the catalyst. However, this is done at the risk of obtaining excessive thermal conversion of the reactants and the amount of heat which can be supplied by the reaction in this manner is thus highly limited, since substantial thermal conversion will materially reduce the yield and/or quantity of the desired products in most catalytic operations.

Another manner of supplying additional heat to the endothermic reaction is to burn fuel, other than the contaminants carried by the catalyst, in the regenerating zone in contact with the catalyst undergoing regeneration therein. In such instances, the rate at which the catalyst is circulated must be sufficient that it will carry all of the required heat at the limited temperature level which can be employed without impairing its activity.

It will be apparent from the above that the final controlling factor in the transfer of heat by the catalyst from the exothermic regenerating to the endothermic reaction zone is the rate at which catalyst is circulated between these zones. This is true regardless of whether combustion of the contaminants in the regenerating zone furnishes sufficient or insufficient heat for conducting the endothermic reaction. However, the rate of catalyst circulation which may be employed without detrimentally affecting the operation is also limited. This is due to the fact that the critical conditions of operation for the endothermic reaction include not only temperature and pressure conditions, but also the ratio between the amount of freshly regenerated catalyst and the amount of reactants supplied to the reactor in any given time. Although this ratio may vary over a considerable range, depending upon the type of reaction being conducted, the composition of the charging stock and the activity and selectivity of the particular catalyst employed in promoting the reaction, as well as the correlation between these factors and the operating temperature and pressure employed in the reaction zone, best results are only achieved when the ratio of catalyst to reactants can be controlled independently of the other operating variables of the process. Thus, circulation of the catalyst at a high rate for the sake of transferring heat from the regenerating zone to the reaction zone may be employed in many instances only with a sacrifice of optimum operating conditions with respect to the weight of freshly regenerated catalyst contacted with a unit weight of reactants in a given time.

The mode of operation provided by the present invention avoids the difficulty above explained, which is commonly encountered in catalytically promoted hydrocarbon conversion reactions of the general type above outlined, while retaining all of the inherent advantages of this general type of operation. This is accomplished by passing regulated quantities of the hot regenerated catalyst or the catalyst undergoing regeneration in indirect contact and heat exchange relation with the reactants undergoing conversion in the presence of the active catalyst. This provision is employed in addition to and in conjunction with the usual provisions for transferring heat from the regenerating zone to the reaction zone by the direct transfer of catalyst between these zones.

The improved mode of operation provided by the invention may be accomplished in the so-called "fluid bed" type of operation, wherein a bed of finely divided catalyst particles is maintained in the reaction zone and in the regenerating zone in turbulent fluid state resembling that of a boiling liquid, with catalyst transported from the fluid bed in the reaction zone to the fluid bed in the regenerating zone in the stream of oxidizing gas employed to fluidize the latter bed and effect combustion therein of the contaminants deposited on the catalyst particles, and with catalyst transported from the regenerating zone to the reaction zone in the stream of hydrocarbon reactants being supplied to the latter. It may also be accomplished in other "moving bed" operations wherein catalyst is transferred from the reaction zone to the regenerating zone and vice versa by mechanical conveying means of various types.

In addition to permitting independent control of the ratio of catalyst to reactants, the improved mode of operation provided by the invention obviates any necessity for preheating the reactants to a higher temperature than that at which the desired conversion reaction will be initiated upon their contact with the catalyst. Since all of the required endothermic heat of reaction can be supplied by the catalyst without the use of an excessively high ratio of catalyst to reactants, there is no necessity for preheating the reactants to a higher temperature than that required for good volumetric efficiency in the reaction zone. Thus, excessive thermal conversion of the reactants is avoided.

The accompanying drawings, comprising Figs. 1 and 2, diagrammatically illustrate two specific forms of apparatus in which the improved process provided by the invention may be conducted.

Fig. 1 of the drawings is an elevational view of a reaction vessel and a regenerating vessel constructed and equipped, with suitable transfer lines, separating equipment and the like, for a fluid bed type of operation. A heat exchanger separate from and connected with the reaction and regenerating vessels is employed in this particular instance for transferring heat, through the medium of the catalyst, from the regenerating zone to the reaction zone.

Fig. 2 is an elevational view, similar to that of Fig. 1, of a modified form of the same general type of apparatus, the essential difference being that, in Fig. 2, the heat exchanger is disposed within and constitutes a part of the reaction vessel, which is shown partially in section.

It will, of course, be understood that the improved mode of operation provided by the invention may be accomplished by various specific forms of equipment other than those illustrated in the drawings. Various modifications and departures from the apparatus illustrated may be employed either in the fluid bed type of operation above mentioned or in that type of operation wherein the catalyst is transported by mechanical means. Numerous other specific forms of apparatus will be apparent to those conversant with the art and it is, therefore, not intended to limit the invention to the apparatus illustrated nor to an operation employing any other specific form of apparatus.

Referring now particularly to Fig. 1, the apparatus here illustrated comprises an elongated, substantially cylindrical reaction vessel A and a similar regenerating vessel B, each adapted to retain therein a fluidized bed of subdivided solid contact material or catalyst, not illustrated.

The fluid catalyst bed in the reactor and the fluid catalyst bed in the regenerator each comprises a relatively dense lower phase, containing a relatively high concentration of catalyst particles, and a materially less dense upper phase, containing a substantially lower concentration of catalyst particles. The approximate lines of demarcation between the light upper phase and the lower dense phase in reactor A and in regenerator B are indicated, for example, by the broken lines PL. However, there is not necessarily any sharp line of demarcation, the catalyst bed, in some instances, being progressively less dense from its lower to its upper extremity.

Catalyst is directed from the dense phase of the fluid bed in reactor A through conduit 3 and a suitable variable orifice or flow control valve 4 into the lower portion of regenerator B. The column of catalyst particles in the vertical section of conduit 3, within and adjacent reactor A, is substantially stripped of hydrocarbon reactants and vaporous and gaseous conversion products by introducing relatively small quantities of a suitable relatively inert gas, such as steam, for example, into conduit 3 on the up-stream side of valve 4 through line 5 and valve 6. The gas thus introduced also serves to keep the column fluidized and prevent excessive compaction of the catalyst particles. A suitable oxidizing gas, such as air or air diluted with combustion gases is supplied through line 7 and valve 8 to conduit 3 on the down-stream side of valve 4 at a temperature suitable for initiating combustion of the deleterious deposits accumulated on the catalyst particles. The oxidizing gas stream thus supplied to conduit 3 picks up and transports the catalyst particles through conduit 3 into regenerator B and therein serves as a fluidizing medium for the catalyst bed maintained in this zone, as well as effecting combustion of the carbonaceous or heavy hydrocarbonaceous contaminants deposited on the catalyst.

The reactivated catalyst particles, heated by the combustion in regenerator B of contaminants deposited on the catalyst supplied to this zone from reactor A, are continuously withdrawn from the dense phase of the fluid bed in the regenerator and directed through conduit 9 and the adjustable orifice or flow-control valve 10 into the lower portion of reactor A. The column of catalyst particles passing through the vertical section of conduit 9, within and adjacent regenerator B, is substantially stripped of oxygen-containing gases and combustion gases by introducing regulated relatively small amounts of relatively inert gas, such as steam, for example, through line 11 and valve 12 into conduit 9 on the up-stream side of valve 10. Hydrocarbon reactants to be converted, preferably after being preheated by well known means, not illustrated, to a temperature suitable for initiating the desired conversion reaction upon their contact with the catalyst, are directed through line 13 and valve 14 into conduit 9 on the down-stream side of valve 10. The hydrocarbon reactants thus supplied to line 9 are in essentially vaporous or gaseous state and they pick up the catalyst in conduit 9 and transport the same therethrough to reactor A, wherein they are converted by contact with the catalyst and wherein they serve as a fluidizing medium for the catalyst bed maintained therein.

Vaporous and/or gaseous hydrocarbons resulting from conversion of the reactants in reactor A are directed from the relatively light upper phase of the fluid bed in the reactor through line 15 to suitable equipment, such as, for example, the cyclone separator 16, wherein at least a substantial portion of the entrained catalyst particles are separated from the vapors and gases. The latter are directed from separator 16 through line 17 to suitable fractionating and recovery equipment, not pertinent to the present invention and therefore not illustrated, and the separated catalyst particles are returned from the lower portion of separator 16 through standpipe 18 to the relatively dense phase of the fluid bed in reactor A.

In a similar manner spent or partially spent reactivating gases and combustion products are directed from the relatively light upper phase of the fluid bed in regenerator B through line 19 to suitable separating equipment, such as the cyclone separator indicated at 20, wherein at least a substantial portion of the entrained catalyst particles are separated from the gases and returned through standpipe 21 to the relatively dense phase of the fluid bed in the regenerator. The gases which are removed from the upper portion of separator 20 through line 22, will contain a considerable quantity of readily available heat and are preferably supplied to suitable heat recovery equipment, not illustrated, such as, for example, a waste heat boiler, steam superheater or hot gas turbine, or they may, when desired, be utilized to preheat the charging stock supplied to the system.

The hot regenerated catalyst returned from regenerator B through conduit 9 to reactor A supplies heat to the endothermic reaction taking place in the latter zone, but in the present invention, as distinguished from previous operations of this general type, it is returned from the regenerator to the reactor only in the quantities necessary to maintain the desired ratio of catalyst to hydrocarbon reactants in the fluid bed maintained in the reaction zone. A corresponding quantity of catalyst is supplied from the reactor to the regenerator through conduit 3 to maintain substantially constant phase levels in the two vessels or a substantially constant volume of catalyst in each of the respective vessels. Any required make-up catalyst, to compensate for catalyst not recovered in the separating equipment, is supplied, as in conventional practice, by well known means, not illustrated, to the reactor or to the regenerator from a suitable catalyst hopper. The rate at which catalyst is circulated from the reactor to the regenerator and from the regenerator back to the reactor through lines 3 and 9 is regulated by adjusting the openings through the adjustable orifices or valves 4 and 10 to maintain a slight pressure drop therethrough.

In order to supply the required additional heat to the endothermic reaction taking place in reactor A, catalyst withdrawn from the fluid bed in this zone and returned thereto is passed in indirect contact and heat exchange relation with hot catalyst withdrawn from and returned to the regenerator. This is accomplished in heat exchanger 23 which may be of any suitable form and, in the case illustrated, comprises a vessel separate from and disposed exterior to the reactor and the regenerator.

Heat is supplied to the heat exchanger from the regenerator by directing the catalyst from the dense phase of the fluid bed in the latter zone through conduit 24 to the heat exchanger. It is thence directed through conduit 25 and a suitable adjustable orifice or flow-control valve 26 into conduit 3 through which it is transported with the catalyst from reactor A, by the oxidizing gas stream from line 7, back to the regenerator, thus setting up a local cycle of hot catalyst from the regenerator through the heat exchanger and back to the regenerator.

Catalyst from the dense phase of the fluid bed in reactor A is directed through conduit 27 to the heat exchanger 23, wherethrough it passes in indirect contact with the hot catalyst supplied to this zone from the regenerator and recovers heat therefrom. It is thence directed through conduit 28 and the adjustable orifice or flow-control valve 29 into conduit 9, wherethrough it is transported by the incoming hydrocarbon reactants from line 13, with the catalyst supplied directly to line 9 from the regenerator, back to the reactor, thus setting up a local cycle of catalyst from the reactor through the heat exchanger and back to the reactor.

It will be apparent that by employing the heat exchange step, above described, heat is transferred through the medium of the catalyst from the regenerating zone to the reaction zone without increasing the ratio of freshly regenerated catalyst to reactants in the stream entering the reactor and without increasing the ratio of contaminated catalyst from the reactor to reactivating gas in the stream entering the regenerator.

When the combustion of contaminants deposited on the catalyst in the reactor and burned therefrom in the regenerator does not result in the sufficient evolution of heat to satisfy the requirements of the endothermic reaction taking place in reactor A, without excessive preheating of the charging stock, additional fuel is supplied to and burned in the regenerator to make up the heat deficiency of the catalyst regenerating operation. The fuel thus utilized may be supplied to the regenerator in any convenient manner either as a normally gaseous or normally liquid fuel or as pulverized or finely divided solid fuel. In the particular case illustrated, the additional fuel required is introduced from any desired source by a suitable pump, compressor or blower, not illustrated, through line 30 and valve 31 into the oxidizing gas stream passing through line 7, wherefrom it is directed through conduit 8 to the regenerator.

The rates at which catalyst from reactor A and catalyst from regenerator B are circulated through the heat exchanger back to the respective reaction and regenerating zones are controlled by regulation of the openings through the adjustable orifices or valves 28 and 29, and proper regulation of the rates of flow of the catalyst through the heat exchanger will permit operation of the regenerating step at a temperature level below that at which damage or permanent impairment to the activity of the catalyst will result even when it is necessary to burn relatively large quantities of extraneous fuel in the regenerator.

Referring now to Fig. 2, the apparatus here illustrated is similar in many respects to that illustrated in Fig. 1 and the various parts of the apparatus shown in Fig. 2, which correspond in form and function to those of Fig. 1, are designated by corresponding prime numbers.

Heat exchanger 32 of Fig. 2 replaces heat exchanger 23 of Fig. 1 and is disposed within reactor A'. It may be of any suitable form and, in the particular case illustrated, comprises a nest of elongated tubular elements 33 extending between and communicating at their opposite ends with heater compartments 34 and 35. Compartment 34 is formed between tube sheets 36 and 37 and compartment 35 is formed between tube sheets 38 and 39 and the tube sheets are attached to the shell of the reactor. To permit the flow of catalyst, reactants and resulting conversion products in the fluid bed of reactor A' about tubes 33, a plurality of tubes 41 extending between tube sheets 38 and 39 establish communication between the lower portion of the reactor and space provided about tubes 33, while a plurality of similar tubes extending between tube sheets 36 and 37 establish communication between the space provided about tubes 33 and the upper portion of the reactor.

To supply heat to the endothermic reaction taking place in reactor A' from the exothermic regeneration taking place in regenerator B' by a catalyst undergoing regeneration, regulated quantities of this material are withdrawn from the upper portion of the dense phase in regenerator B' and directed through conduit 43 and the adjustable orifice or flow-control valve 44 to header compartment 35 of the heat exchanger. The relatively hot catalyst flows from header compartment 35 upwardly through tubes 33, transmitting heat therethrough to the fluid bed in reactor A' and being discharged from the upper end of the tubes 33 into header compartment 34, from which it is returned through conduit 42 to the lower region of the dense phase in regenerator B'.

To effect transportation of the catalyst from regenerator B' through heat exchanger 32, a portion of the air or other oxidizing gas for effecting regeneration of the catalyst is directed through line 45, line 46 and valve 48 into conduit 43 on the down-stream side of valve 44 and causes flow of the catalyst through the heat exchanger by its gas-lift action. When desired, particularly in case the pressure drop encountered by the hot catalyst and gas passing through heat exchanger 32 is relatively high, another portion of the oxidizing gas may be directed from line 45 through line 47 and valve 49 into conduit 42, as illustrated, to assist transportation of the catalyst through the heat exchanger.

It will, of course, be understood that, when desired, the heat exchanger may be disposed within the regenerator instead of within the reactor, in which case catalyst from the dense phase of the reactor will be transported through the tubular elements of the heat exchanger in indirect contact and heat transfer relation with the fluid bed in the regenerator, to pick up heat from the latter, and will then be returned to the dense phase of the fluid bed in the reactor. In such instances, steam or any other relatively inert gas, which will not adversely affect the reaction and will not contaminate the conversion products, or regulated quantities of the hydrocarbon reactants may be employed as the transporting medium for the catalyst circulated through the heat exchanger.

As an illustration of one specific operation of the process, as compared with a similar operation conducted in accordance with conventional fluid bed practice, we will consider a process for the catalytic dehydrogenation of normal butane employing a dehydrogenating catalyst which limits the temperature which can be safely employed in the regenerating step to approximately 1250° F.

Assuming that the desired conversion of butane per pass through the system is approximately 40%, the operating conditions chosen for producing the desired results are a temperature of approximately 1150° F. in the reactor, an operating pressure of approximately 10 pounds gauge, a space velocity in the reactor (expressed as weight of reactants per weight of catalyst per hour) of about 2, and a weight ratio of freshly regenerated catalyst to reactants in the stream entering the reactor of about 3. Under these conditions the combustible material deposited on the catalyst will amount to approximately 2.10% by weight of the butane charge.

Disregarding the heat loss from the system by radiation, which is unknown and comparatively small, and assuming a capacity of approximately 10,000 pounds per hour of normal butane charged to the system; when this charge is preheated to a temperature of approximately 800° F. prior to its contact with the catalyst, the heat which must be supplied to the reaction zone, in addition to that carried by the preheated charge, is approximately 7,050,000 B. t. u. per hour, of which approximately 4,080,000 is the required heat of reaction, the remaining 2,970,000 being the heat required to bring the charging stock to the desired reaction temperature of approximately 1150° F. The heat liberated by combustion of the deposited material on the catalyst in the regenerating zone is approximately 3,255,000 B. t. u. per hour. With air employed as the oxidizing gas for burning the deposited catalyst and supplied to the regenerating zone at a temperature of 60° F., approximately 1,810,000 B. t. u. per hour are utilized in heating the air to the temperature of approximately 1250° F. which is employed in the regenerating zone. This leaves approximately 1,445,000 B. t. u. per hour available from combustion of the catalyst deposit for transfer to the reaction zone. The deficiency, amounting to approximately 5,506,000 B. t. u. per hour, is made up by supplying additional fuel to the regenerating zone and burning the same therein.

If it is attempted to operate the process in a conventional manner under the conditions above outlined, the total 7,050,000 B. t. u. per hour would have to be transferred by circulating the catalyst between and through the reaction and regenerating zones in direct contact with the reactants and reactivating gases. To accomplish this the high rate of catalyst circulation would result in a weight ratio of freshly regenerated catalyst to butane charge entering reactor of approximately 30.7 to 1. This is approximately ten times the optimum ratio and would result in a materially lower yield of butylenes and increased yields of heavy carbonaceous material and light gases. The increased yield of carbonaceous material would somewhat reduce the required quantity of additional fuel to be supplied to the regenerating zone but would not influence the rate of catalyst circulation and the ratio of catalyst to butane in the reactor.

With the improved mode of operation provided by the invention, catalyst is circulated between and through the reaction and regenerating zones at a rate regulated to give the optimum ratio of approximately 3 to 1 between the weight of catalyst and the weight of butane charge in the reactor. Under these conditions the heat transferred from the regenerating zone to the reaction zone in the conventional manner is approximately 690,000 B. t. u. per hour and the additional heat required, amounting to approximately 6,360,000 B. t. u. per hour, is transferred through the heat exchanger. This results in a materially improved operation, giving a higher yield of butylenes based on the charging stock and a lower yield of carbonaceous deposit and light gases. Reduction in the amount of carbonaceous material deposited on the catalyst in turn results in a longer catalyst life, due to the fact that less frequent regeneration of the catalyst is required.

I claim as my invention:

A conversion process which comprises endothermically reacting a fluid reactant in the presence of subdivided solid catalyst in a reaction zone, simultaneously exothermically regenerating solid catalyst in a regenerating zone, maintaining a relatively dense catalyst bed in each of said zones, removing a first stream and a second stream of heated catalyst from the regenerating zone at spaced points below the upper surface of the bed in the regenerating zone, simultaneously removing a first stream and a second stream of cooler catalyst from the reaction zone at spaced points below the upper surface of the bed in the reaction zone, transporting said first stream of heated catalyst to the reaction zone in suspension in at least a portion of the fluid reactant to be endothermically reacted in this zone and introducing the suspension into the lower portion of the catalyst bed in the reaction zone, transporting said first stream of cooler catalyst to the regenerating zone in suspension in an oxygen-containing gas and introducing this suspension into the lower portion of the catalyst bed in the regenerating zone, passing said second stream of heated catalyst and said second stream of cooler catalyst in indirect heat exchange relation with each other, thereafter commingling said second stream of heated catalyst with said first stream of cooler catalyst being transported to the regenerating zone in suspension in said oxygen-containing gas, and commingling said second stream of cooler catalyst, after its heat exchange as aforesaid, with said first stream of heated catalyst being transported to the reaction zone in suspension in the fluid reactant.

GORDON B. ZIMMERMAN.